(12) United States Patent
Saito

(10) Patent No.: US 12,725,868 B2
(45) Date of Patent: Sep. 1, 2026

(54) BATTERY UNIT

(71) Applicant: ISUZU MOTORS LIMITED, Tokyo (JP)

(72) Inventor: Hayato Saito, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 523 days.

(21) Appl. No.: 18/546,125

(22) PCT Filed: Mar. 18, 2022

(86) PCT No.: PCT/JP2022/012822
§ 371 (c)(1),
(2) Date: Aug. 11, 2023

(87) PCT Pub. No.: WO2022/202711
PCT Pub. Date: Sep. 29, 2022

(65) Prior Publication Data

US 2024/0136631 A1 Apr. 25, 2024
US 2024/0234900 A9 Jul. 11, 2024

(30) Foreign Application Priority Data

Mar. 22, 2021 (JP) ................................ 2021-046931

(51) Int. Cl.
*H01M 50/242* (2021.01)
*H01M 50/249* (2021.01)
*H01M 50/262* (2021.01)

(52) U.S. Cl.
CPC ....... *H01M 50/242* (2021.01); *H01M 50/249* (2021.01); *H01M 50/262* (2021.01); *H01M 2220/20* (2013.01)

(58) Field of Classification Search
None
See application file for complete search history.

(56) References Cited

U.S. PATENT DOCUMENTS

2019/0009662 A1 1/2019 Toyota

FOREIGN PATENT DOCUMENTS

| | | | |
|---|---|---|---|
| CN | 108649150 | A | 10/2018 |
| DE | 102016100879 | A1 | 8/2016 |
| JP | 2017-193300 | A | 10/2017 |
| JP | 2017-196959 | A | 11/2017 |
| JP | 2019-014349 | A | 1/2019 |
| SE | 2050378 | A1 | 1/2021 |

OTHER PUBLICATIONS

Patent Cooperation Treaty, International Search Report, Application No. PCT/JP2022/012822, dated Jun. 7, 2022, in 4 pages.

*Primary Examiner* — Colin W. Slifka
(74) *Attorney, Agent, or Firm* — PROCOPIO, CORY, HARGREAVES & SAVITCH LLP

(57) ABSTRACT

This battery unit includes a plurality of batteries, and an accommodation part which is fixed between a plurality of frames of a vehicle and stores the plurality of batteries. Each of the batteries has a plurality of battery cells, a fixing part for fixing the plurality of battery cells to the accommodation part, and an elastic member which is provided to the fixing part inhibits stress from being generated in the batteries due to force applied from the plurality of frames. The plurality of battery cells are arranged side by side in the horizontal direction of the vehicle, and the elastic member expands/contracts in the height direction of the vehicle orthogonal to the horizontal direction.

7 Claims, 6 Drawing Sheets

BATTERY UNIT

CROSS-REFERENCE TO RELATED APPLICATIONS

The present application is a U.S. National Stage entry of PCT Application number PCT/JP2022/012822, filed on Mar. 18, 2022, which claims priority under 35 U.S.C § 119(b) to Japanese Patent Application No. 2021-046931, filed on Mar. 22, 2021, contents of which are incorporated herein by reference in their entirety.

TECHNICAL FIELD

The present disclosure relates to a battery unit.

BACKGROUND OF THE INVENTION

Conventionally, a vehicle is provided with a battery. Patent Document 1 discloses a structure in which an elastic sealing material is disposed in a gap formed between a battery pack and a rocker.

PRIOR ART

Patent Document

Patent Document 1: Japanese Unexamined Patent Application Publication No. 2019-14349

BRIEF DESCRIPTION OF THE INVENTION

Problem to be Solved by the Invention

When an accommodation part that accommodates a plurality of batteries is provided between a plurality of frames, elastic members may be provided between the frames and the accommodation part to suppress stresses on the batteries caused by forces applied by the plurality of frames. In this case, a space for the accommodation part to be deformed is required between the frames and the accommodation part, and it was difficult to increase the number of batteries.

The present disclosure focuses on this point, and an object thereof is to provide a battery unit that can easily increase the number of batteries provided between a plurality of frames.

Means for Solving the Problem

A first aspect of the disclosure provides a battery unit that includes a plurality of batteries, and an accommodation part that is fixed between a plurality of frames of a vehicle and accommodates the plurality of batteries, wherein the battery includes a plurality of battery cells, a fixing part for fixing the plurality of battery cells to the accommodation part, and an elastic member that is provided to the fixing part and suppresses stresses on the batteries by forces applied by the plurality of frames.

Further, the plurality of battery cells may be arranged side by side in a horizontal direction of the vehicle, the elastic member may expand and contract in a height direction of the vehicle orthogonal to the horizontal direction.

Furthermore, the battery unit may further include a fixing member that extends in the height direction of the vehicle and connects the elastic member to the accommodation part, wherein the fixing part may have a first hole into which the elastic member is inserted, the elastic member may include an outer cylindrical part having its outer surface fixed to an inner surface of the first hole, an inner cylindrical part that has a second hole and is provided inside the outer cylindrical part in a radial direction of the elastic member, the lower end of the inner cylindrical part in the height direction contacting the accommodation part at a position lower than the lower end of the outer cylindrical part in the height direction, and an elastic member body that is provided between the outer cylindrical part and the inner cylindrical part, wherein the accommodation part may have a third hole into which the fixing member is inserted, and the fixing member may be fixed to the accommodation part, in a state where the fixing member is inserted into i) the second hole of the elastic member, which is inserted into the first hole of the fixing part, and ii) the third hole of the accommodation part. In addition, a space may be formed between the elastic member and the accommodation part.

Further, the fixing part may include a first component that restrains the plurality of battery cells from the front-rear direction of the vehicle, a second component for connecting the plurality of battery cells to the accommodation part, the second component being provided on both end sides of the plurality of battery cells in the vehicle width direction of the vehicle, wherein the second component may have a hole formed to accommodate the elastic member.

Furthermore, a plurality of holes for accommodating a plurality of the elastic members may be formed at different positions in the front-rear direction of the vehicle in the second component.

Effect of the Invention

According to the present disclosure, the number of batteries provided between a plurality of frames can be increased easily in a battery unit.

DESCRIPTION OF EMBODIMENTS

[Battery Unit S Installed in Vehicle A]

Figure 1:
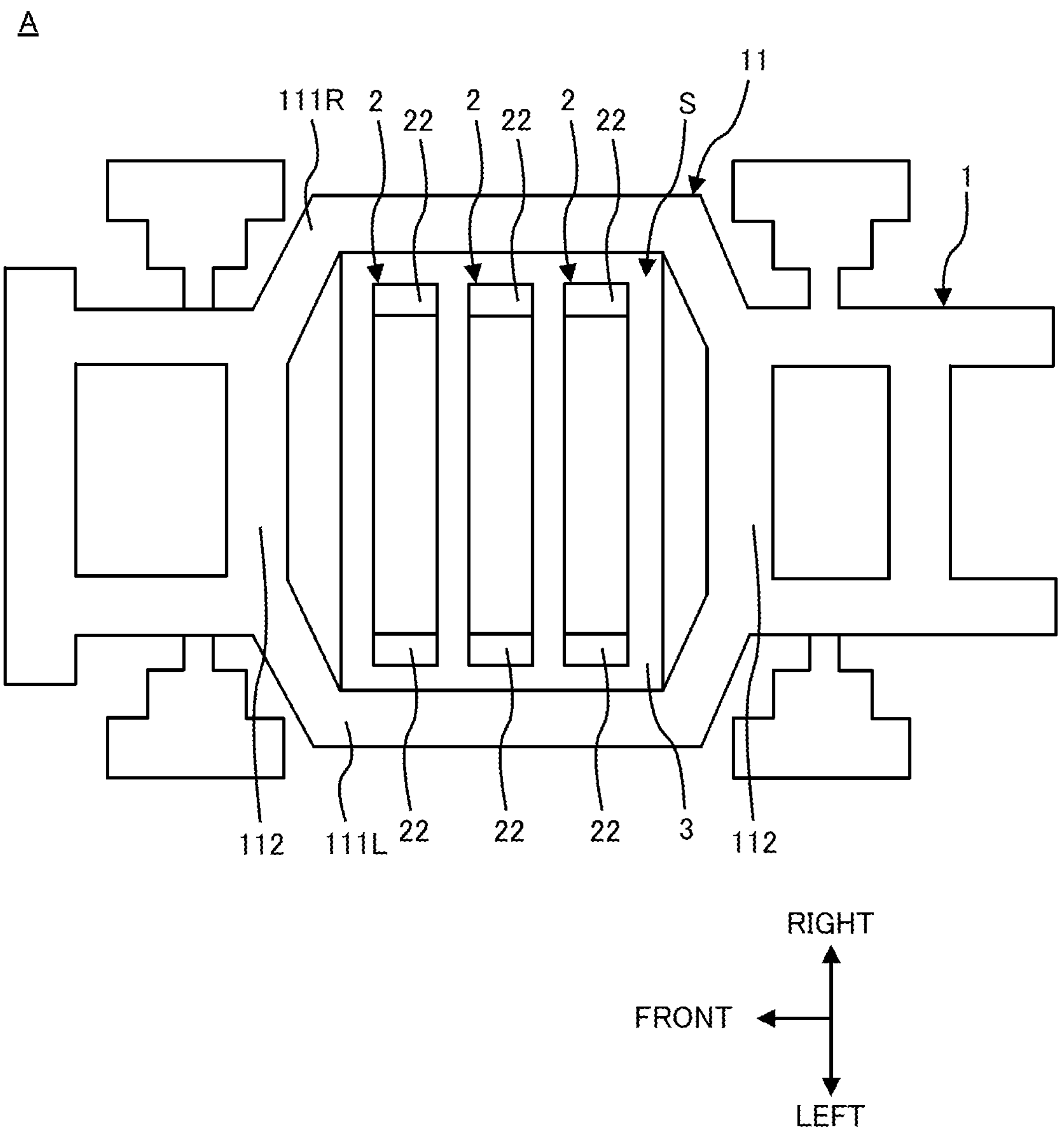
FIG. 1 shows a battery unit according to the embodiment as provided in a vehicle.

FIG. 1 shows a battery unit S according to the embodiment as provided in a vehicle A.

The battery unit S is used as a power supply battery for driving a traveling motor of a hybrid vehicle or an electric vehicle (EV). The battery unit S is mounted on a frame structure 1, described later, in the vehicle A.

The vehicle A includes the frame structure 1. The frame structure 1 contains, for example, a ladder frame. The frame structure 1 extends in a front-rear direction of the vehicle A. The frame structure 1 includes a plurality of frames 11. The frame structure 1 includes a left side member 111L, a right side member 111R, and a cross member 112 as the plurality of frames 11.

The left side member 111L extends in the front-rear direction of the vehicle A. The left side member 111L is provided to a left portion of the vehicle A in a vehicle width direction. The right side member 111R extends in the front-rear direction of the vehicle A. The right side member 111R is provided on a right portion of the vehicle A in the vehicle width direction. The cross member 112 is provided between the left side member 111L and the right side member 111R, extending in the vehicle width direction of the vehicle A. A plurality of cross members 112 are provided in the front-rear direction of the vehicle A. The battery unit S is provided between the left side member 111L and the right side member 111R in the vehicle width direction of the vehicle A.

[Configuration of Battery Unit S]

Figure 2:
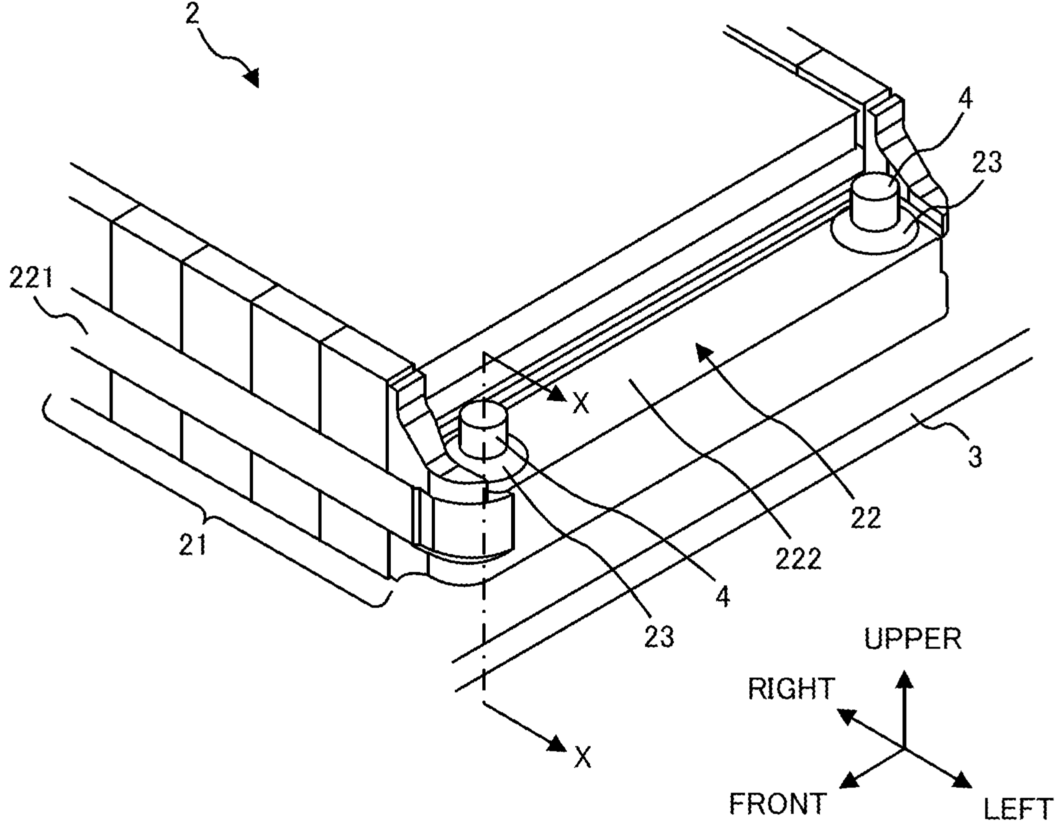
FIG. 2 shows a structure in the vicinity of an end plate of a battery.

FIG. 2 shows a structure in the vicinity of an end plate 222 of a battery 2.

The battery unit S includes a plurality of batteries 2, an accommodation part 3, and a plurality of fixing members 4. The battery 2 stores electric power. The plurality of batteries 2 are arranged side by side in the front-rear direction of the vehicle A. The number of batteries 2 is arbitrary. Further, the direction in which the plurality of batteries 2 are arranged is arbitrary. The details of the battery 2 will be described later.

The accommodation part 3 is fixed between the plurality of frames 11 of the vehicle A. The accommodation part 3 is fixed between the left side member 111L and the right side member 111R in the vehicle width direction of the vehicle A. The accommodation part 3 accommodates the plurality of batteries 2. The accommodation part 3 has, for example, a box shape. The details of the accommodation part 3 will be described later. The fixing member 4 is a component for connecting the battery 2 to the accommodation part 3. The fixing member 4 contains, for example, a bolt. The details of the fixing member 4 will be described later.

[Configuration of Battery 2]

The battery 2 includes a plurality of battery cells 21, fixing parts 22, and elastic members 23. The battery cell 21 stores electric power. The battery cell 21 has, for example, a plate shape. The plurality of battery cells 21 are arranged side by side in a horizontal direction of the vehicle A. The plurality of battery cells 21 are arranged side by side in the vehicle width direction of the vehicle A. The number of battery cells 21 is arbitrary. Further, the direction in which the plurality of battery cells 21 are arranged is arbitrary.

The fixing part 22 is a component for fixing the plurality of battery cells 21 to the accommodation part 3. The details of the fixing part 22 will be described later. The elastic member 23 is provided to the fixing part 22. The elastic member 23 suppresses stresses on the batteries 2 caused by forces applied by the plurality of frames 11. The details of the elastic member 23 will be described later.

Figure 3:
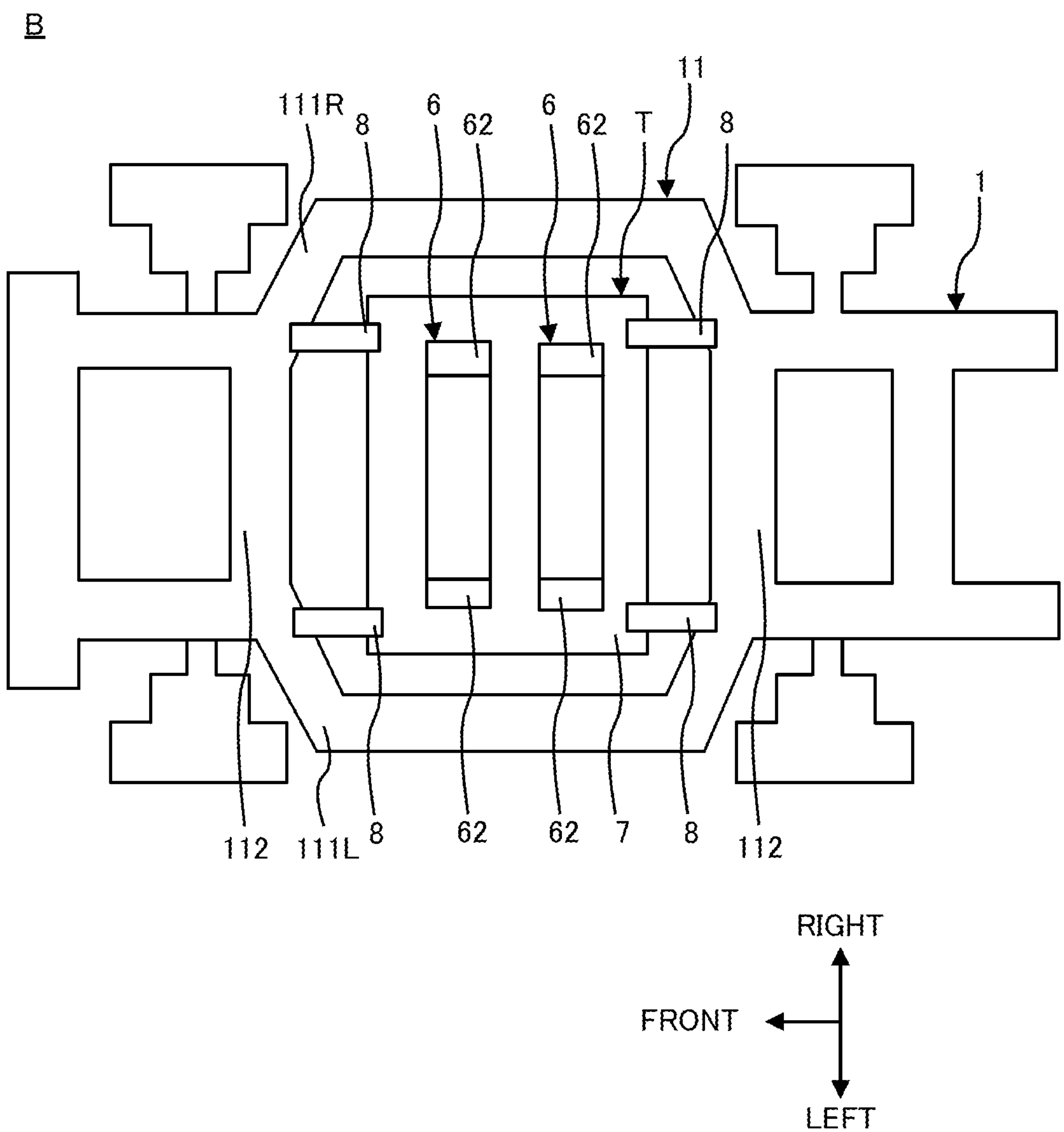
FIG. 3 shows a conventional battery unit in a vehicle as a comparative example.

FIG. 3 shows a conventional battery unit T in a vehicle B as a comparative example.

The conventional battery unit T differs from the battery unit S in that batteries 6 do not have elastic members and a plurality of elastic members 8 are provided between an accommodation part 7, which accommodates the plurality of batteries 6, and a plurality of frames 11.

The conventional battery unit T is mounted on a frame structure 1 of the vehicle B. The conventional battery unit T includes the plurality of batteries 6 and the accommodation part 7. The battery 6 stores electric power like the battery 2. The plurality of batteries 6 are arranged side by side in a front-rear direction of the vehicle B. The battery 6 includes a plurality of battery cells (not shown in figures) and fixing parts 62. The fixing part 62 is a component for fixing the plurality of battery cells to the accommodation part 7, like the fixing part 22. The plurality of battery cells are fixed to the accommodation part 7 by the fixing parts 62.

The accommodation part 7 accommodates the plurality of batteries 6. The accommodation part 7 has, for example, a box shape. The accommodation part 7 is connected between the plurality of frames 11 of the vehicle B via the elastic members 8. The elastic members 8 are provided between the frames 11 and the accommodation part 7. The elastic members 8 are provided between the left side member 111L and the accommodation part 7, and between the right side member 111R and the accommodation part 7. The number of elastic members 8 is arbitrary. Further, the elastic members 8 may be provided, for example, between the cross member 112 and the accommodation part 7.

Figure 4:
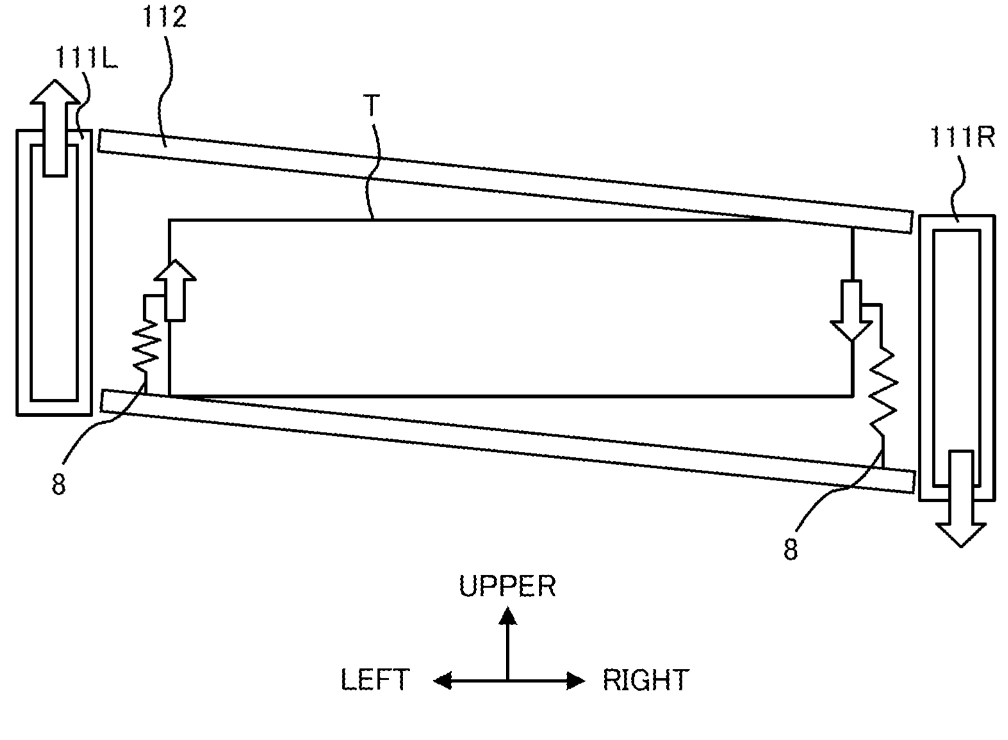
FIG. 4 shows the plurality of frames 11 that are provided with the conventional battery unit T and are displaced.

FIG. 4 shows the plurality of frames 11 that are provided with the conventional battery unit T and are displaced.

When the vehicle B is travelling, the frame structure 1 is twisted, for example, in the vehicle width direction of the vehicle B, causing the left side member 111L and the right side member 111R to be displaced respectively. Therefore, the forces applied by the left side member 111L and the right side member 111R tend to generate a stress on the batteries 6 provided between the left side member 111L and the right side member 111R.

For example, the left side member 111L may move upwards and the right side member 111R may move downwards in a height direction of the vehicle B when the frame structure 1 is twisted in the vehicle width direction of the vehicle B. In this case, a force is applied to the battery 6 such that the left end of the battery 6 moves upwards and the right end of the battery 6 moves downwards. Therefore, the battery 6 tends to receive a stress. Further, for example, when the frame structure 1 is twisted in the front-rear direction of the vehicle B, the battery 6 tends to receive a stress because the front end of the battery 6 and the rear end of the battery 6 are respectively displaced and twisted in the front-rear direction of the vehicle B.

As shown in FIG. 4, the elastic members 8 are provided between the plurality of frames 11 and the accommodation part 7 in the conventional battery unit T in order to suppress the stresses on the batteries 6 caused by the forces applied by the plurality of frames 11 in this manner. However, in the conventional battery unit T, a space for the accommodation part 7 to deform due to expansion and contraction of the elastic member 8 is required between the plurality of frames 11 and the accommodation part 7. This makes it difficult to increase the number of batteries 6.

In contrast, as described above, the battery unit S according to the embodiment is fixed between the plurality of frames 11 of the vehicle A, and includes the accommodation part 3 that accommodates the plurality of batteries 2, and the battery 2 is provided to the fixing part 22. In such a configuration, the elastic member 23 is provided to suppress the stresses on the batteries 2 caused by the forces applied by the plurality of frames 11. Therefore, in the battery unit S, no elastic member is provided between the frame 11 and the accommodation part 3, and no space for the accommodation part 3 to be deformed is required. Thus, it is easier to increase the number of batteries 2 provided between the plurality of frames 11 in the battery unit S.

As shown in FIG. 2, the fixing part 22 includes a plurality of binding bars 221 and a plurality of end plates 222. The binding bar 221 is a first component for restraining the plurality of battery cells 21 arranged side by side in the vehicle width direction of the vehicle A from the front-rear direction of the vehicle A. The binding bar 221 extends in the vehicle width direction of the vehicle A. The plurality of binding bars 221 are respectively provided in front and behind the plurality of battery cells 21 arranged side by side in the vehicle width direction of the vehicle A. The end portions of the binding bar 221 in the vehicle width direction of the vehicle A are connected respectively to the end plates 222 that are provided on respective end sides, in the vehicle width direction of the vehicle A, of the plurality of battery cells 21 arranged side by side in the vehicle width direction of the vehicle A.

Figure 5:
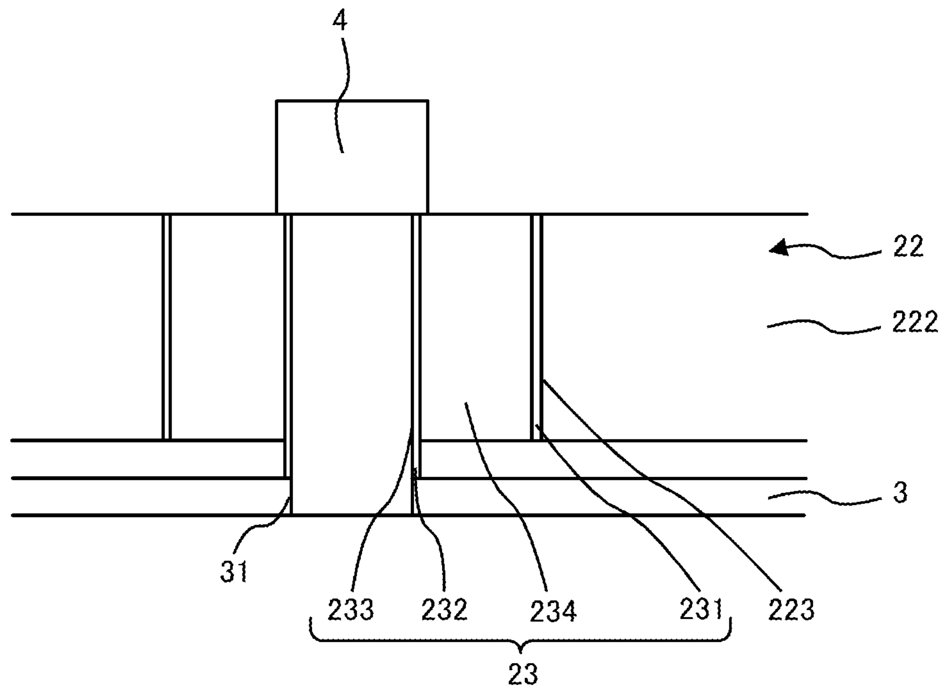
FIG. 5 is a cross-sectional view at a line X-X in FIG. 2.

FIG. 5 is a cross-sectional view at a line X-X in FIG. 2. The end plate 222 is a second component for connecting the plurality of battery cells 21 to the accommodation part 3. The end plates 222 are provided on both end sides of the plurality of battery cells 21 arranged side by side in the vehicle width direction of the vehicle A. The end plate 222 has a plurality of holes 223. The elastic member 23 is inserted into the hole 223. The plurality of holes 223 are formed at both end portions of the end plate 222 in the front-rear direction of the vehicle A.

The plurality of battery cells 21 are fixed in a side-by-side arrangement in the vehicle width direction of the vehicle A. Specifically, the plurality of battery cells 21 are fixed by i) the end plates 222 provided on both end sides of the plurality of battery cells 21 in the vehicle width direction and ii) the binding bars 221 provided in front of and behind the plurality of battery cells 21. The plurality of battery cells 21 are connected to the accommodation part 3 by connecting the end plates 222 to the accommodation part 3.

[Structure in the Vicinity of Elastic Member 23 of Battery 2]

Figure 6:
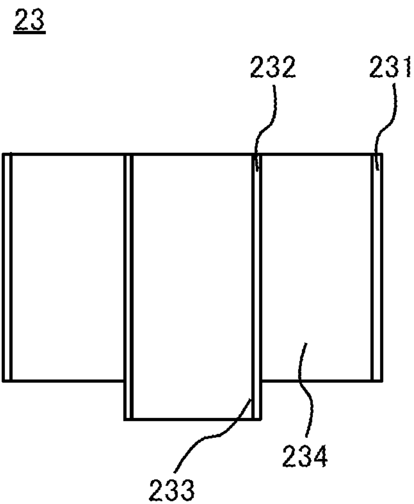
FIG. 6 shows a structure of an elastic member.

FIG. 6 shows a structure of the elastic member 23. The elastic member 23 contains, for example, a rubber bush. The plurality of elastic members 23 are provided at both end portions of the end plate 222 in the front-rear direction of the vehicle A. The elastic member 23 expands and contracts in the height direction of the vehicle A, which is orthogonal to the horizontal direction of the vehicle A. Therefore, in the battery unit S, the deformation of the plurality of battery cells 21 and the fixing parts 22 in the height direction of the vehicle A caused by the forces applied by the plurality of frames 11 can be suppressed.

As shown in FIG. 6, the elastic member 23 includes an outer cylindrical part 231, an inner cylindrical part 232, and an elastic member body 234. The outer cylindrical part 231 has its outer surface fixed to the inner surface of the hole 223. The inner cylindrical part 232 is provided inside the outer cylindrical part 231 in the radial direction of the elastic member 23. The inner cylindrical part 232 has its lower end, in the height direction of the vehicle A, in contact with the accommodation part 3 below the lower end, in the height direction of the vehicle A, of the outer cylindrical part 231. The inner cylindrical part 232 has a hole 233. The fixing member 4 is inserted into the hole 233.

The elastic member body 234 is provided between the outer cylindrical part 231 and the inner cylindrical part 232. The accommodation part 3 has a plurality of holes 31. The fixing member 4 is inserted into the hole 31.

The fixing member 4 extends in the height direction of the vehicle A. The fixing member 4 is a component for connecting the elastic member 23 to the accommodation part 3. The fixing member 4 is fixed to the accommodation part 3 in a state where the fixing member 4 is inserted into i) the hole 233 of the elastic member 23, which is inserted into the hole 223 of the fixing part 22, and ii) the hole 31 of the accommodation part 3.

The end plate 222 is connected to the accommodation part 3 by inserting the fixing member 4 into i) the hole 233 of the elastic member 23, which is inserted into the hole 223 of the end plate 222 and ii) the hole 31 of the accommodation part 3, and tightening the inserted fixing member 4 to the accommodation part 3. As shown in FIG. 5, a space is formed in the height direction of the vehicle A between i) the plurality of battery cells 21, the fixing part 22, the outer cylindrical part 231, and the elastic member body 234 and ii) the accommodation part 3. Therefore, in the battery unit S, even when the forces are applied by the plurality of frames 11, it is possible to suppress the stresses on the plurality of battery cells 21 and the fixing part 22 due to expansion and contraction of the elastic member body 234.

In the battery unit S, as described above, the fixing part 22 and the accommodation part 3 are connected by tightening the fixing member 4 to the accommodation part 3, in a state where the fixing member 4 inserted into i) the hole 233 of the elastic member 23, which is in the hole 223 of the fixing part 22, and ii) the hole 31 of the accommodation part 3. Thus, a portion of the elastic member 23 being exposed outside the fixing part 22 can be reduced. As a result, in the battery unit S, it is easier to increase the number of batteries 2 accommodated in the accommodation part 3, in a state where the battery 2 includes the elastic member 23.

[Effects of Battery Unit S According to the Embodiment]

The battery unit S according to the embodiment includes the plurality of batteries 2 and the accommodation part 3 which is fixed between the plurality of frames 11 of the vehicle A and accommodates the plurality of batteries 2. The battery 2 includes the plurality of battery cells 21, the fixing parts 22 for fixing the plurality of battery cells 21 to the accommodation part 3, and the elastic members 23 provided to the fixing parts 22 for suppressing the stresses on the batteries 2 caused by the forces applied by the plurality of frames 11.

The battery unit S according to the embodiment is fixed between the plurality of frames 11 of the vehicle A in this manner, and includes the accommodation part 3 for accommodating the plurality of batteries 2. Also, the battery 2 includes the elastic member 23 that is provided to the fixing part 22 and suppresses the stresses on the battery 2 by the forces applied by the plurality of frames 11. Therefore, in the battery unit S, no elastic member is provided between the frames 11 and the accommodation part 3, and no space for the accommodation part 3 to be deformed is required. Thus, it is easier to increase the number of batteries 2 provided between the plurality of frames 11 in the battery unit S.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

DESCRIPTION OF SYMBOLS

A vehicle
1 frame structure
11 frame
111L left side member
111R right side member
112 cross member S battery unit
2 battery
21 battery cell
22 fixing part
221 binding bar
222 end plate
223 hole
23 elastic member
231 outer cylindrical part
232 inner cylindrical part
233 hole
234 elastic member body
3 accommodation part
31 hole
4 fixing member
B vehicle
T conventional battery unit
6 battery
62 fixing part
7 accommodation part
8 elastic member

The invention claimed is:

1. A battery unit comprising:
a plurality of batteries; and
an accommodation part that is fixed between a plurality of frames of a vehicle and accommodates the plurality of batteries,
wherein the battery includes:
a plurality of battery cells,
a fixing part for fixing the plurality of battery cells to the accommodation part,
an elastic member that is provided to the fixing part and suppresses stresses on the batteries by forces applied by the plurality of frames, and
wherein the fixing part has a first hole into which the elastic member is inserted.

2. The battery unit according to claim 1, wherein
the plurality of battery cells are arranged side by side in a horizontal direction of the vehicle,
the elastic member expands and contracts in a height direction of the vehicle orthogonal to the horizontal direction.

3. The battery unit according to claim 1, further comprising:
a fixing member that extends in a height direction of the vehicle and connects the elastic member to the accommodation part, wherein
the elastic member includes:
an outer cylindrical part having its outer surface fixed to an inner surface of the first hole,
an inner cylindrical part that has a second hole and is provided inside the outer cylindrical part in a radial direction of the elastic member, a lower end of the inner cylindrical part in the height direction contacting the accommodation part at a position lower than the lower end of the outer cylindrical part in the height direction, and
an elastic member body that is provided between the outer cylindrical part and the inner cylindrical part, wherein
the accommodation part has a third hole into which the fixing member is inserted, and
the fixing member is fixed to the accommodation part, in a state where the fixing member is inserted into i) the second hole of the elastic member, which is inserted into the first hole of the fixing part, and ii) the third hole of the accommodation part.

4. The battery unit according to claim 3, wherein
a space is formed between the elastic member and the accommodation part.

5. The battery unit according to claim 1, wherein
the fixing part includes:
a first component that restrains the plurality of battery cells from a front-rear direction of the vehicle,
a second component for connecting the plurality of battery cells to the accommodation part, the second component being provided on both end sides of the plurality of battery cells in a width direction of the vehicle, wherein
the second component has the first hole.

6. The battery unit according to claim 5, wherein
a plurality of the first holes are formed at different positions in the front-rear direction of the vehicle in the second component.

7. A battery unit comprising:
a plurality of batteries; and
an accommodation part that is fixed between a plurality of frames of a vehicle and accommodates the plurality of batteries,
wherein the battery includes:
a plurality of battery cells,
a fixing part for fixing the plurality of battery cells to the accommodation part,
an elastic member that is provided to the fixing part and suppresses stresses on the batteries by forces applied by the plurality of frames, and
wherein the fixing part includes:
a first component that restrains the plurality of battery cells from a front-rear direction of the vehicle,
a second component for connecting the plurality of battery cells to the accommodation part, the second component being provided on both end sides of the plurality of battery cells in a width direction of the vehicle, wherein
the second component has a hole formed to accommodate the elastic member.

* * * * *